United States Patent
Shin et al.

(10) Patent No.: US 7,929,091 B2
(45) Date of Patent: Apr. 19, 2011

(54) METHOD OF MANUFACTURING A DISPLAY PANEL

(75) Inventors: Yong-Hwan Shin, Yongin-si (KR); Jun-Woo Lee, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 259 days.

(21) Appl. No.: 12/357,753

(22) Filed: Jan. 22, 2009

(65) Prior Publication Data

US 2009/0191782 A1     Jul. 30, 2009

(30) Foreign Application Priority Data

Jan. 29, 2008   (KR) .................. 10-2008-0009147

(51) Int. Cl.
*G02F 1/1337*   (2006.01)

(52) U.S. Cl. .................................... 349/124; 349/129
(58) Field of Classification Search ............... 349/124
See application file for complete search history.

(56) References Cited

FOREIGN PATENT DOCUMENTS

| KR | 1020020040575 | 5/2002 |
|---|---|---|
| KR | 1020050076055 | 7/2005 |
| KR | 1020060130388 | 12/2006 |

*Primary Examiner* — Richard H Kim
(74) *Attorney, Agent, or Firm* — F. Chau & Associates, LLC

(57) ABSTRACT

In a method of manufacturing a display panel, a first alignment member is formed on a first substrate. Liquid crystal is sealed between the first substrate and a second substrate opposite to the first substrate. Then, an electric field is applied to the liquid crystal to align the liquid crystal. Ultraviolet light is irradiated onto the first alignment member to form a second alignment member while applying the electric field to the liquid crystal.

17 Claims, 8 Drawing Sheets

METHOD OF MANUFACTURING A DISPLAY PANEL

CROSS-REFERENCE TO RELATED APPLICATIONS

This application claims priority to Korean Patent Application No. 2008-9147, filed on Jan. 29, 2008 in the Korean Intellectual Property Office (KIPO), the contents of which are incorporated herein by reference in their entirety.

BACKGROUND OF THE INVENTION

1. Technical Field

Embodiments of the present invention relate to a method of manufacturing a display panel. More particularly, embodiments of the present invention relate to a method of manufacturing a display panel capable of improving image quality.

2. Discussion of the Related Art

In the modern information age, display devices are being developed to process information and display images using the processed information. Particularly, liquid crystal display (LCD) devices are being rapidly developed according to demand since the LCD devices are thin and light weight, and consume low power.

An LCD device displays images using the properties of liquid crystal molecules, such as optical anisotropy, polarization, etc. When an electric field is applied to the liquid crystal molecules having a slim and long shape, arrangements of the liquid crystal molecules may be changed by the electric field. Therefore, an amount of light passing through the liquid crystal may be controlled. The LCD device displays image information using polarized light aligned by the liquid crystal molecules having the optical anisotropy.

A display panel for the LCD device includes two substrates opposite to each other and liquid crystal inserted between the two substrates. For displaying images, arrangements of the liquid crystal may be uniformly controlled. For controlling the arrangements of the liquid crystal, the display panel includes an alignment member aligning the liquid crystal. For example, a surface of an organic polymer layer is rubbed by a specific cloth to form the alignment member. However, the alignment member may be polluted by fine dust attached to the cloth and fibers of the cloth. In addition, thin film transistors (TFTs) of the display panel may be damaged by static electricity caused by rubbing the surface of the alignment member.

In response to possible pollution of the alignment member and static electricity damage to the TFTs, a photo-alignment method, which is a non-contact method, has been developed. However, when the alignment member is formed by the photo-alignment method, the display panel may display afterimages because the polar anchoring energy of the alignment member is small.

SUMMARY OF THE INVENTION

Embodiments of the present invention provide a method of manufacturing a display panel capable of preventing afterimages from being displayed.

According to an aspect of the present invention, there is provided a method of manufacturing a display panel. In the method of manufacturing the display panel, a first alignment member is formed on a first substrate. Liquid crystal is sealed between the first substrate and a second substrate opposite to the first substrate. Then, an electric field is applied to the liquid crystal to align the liquid crystal. Ultraviolet light is irradiated onto the first alignment member to form a second alignment member while applying the electric field to the liquid crystal.

For forming the first alignment member, an alignment material may be spread on the first substrate to form an alignment material layer, and ultraviolet light may be irradiated onto the alignment material layer to form the first alignment member. The ultraviolet light may be irradiated onto a first region of the alignment material layer in a first direction, and the ultraviolet light may be irradiated onto a second region of the alignment material layer adjacent to the first region in a second direction different from the first direction.

The ultraviolet light may be irradiated onto a first alignment layer of the first alignment member and a first photoreactor of the first alignment member protruding from a surface of the first alignment layer to form a second alignment layer of the second alignment member and a second photoreactor of the second alignment member protruding from a surface of the second alignment layer. For aligning the liquid crystal, a first voltage may be applied to a first electrode of the first substrate formed under the first alignment member, and a second voltage different from the first voltage may be applied to a second electrode of the second substrate. The first voltage may have a level that is larger than a level of a voltage for displaying a gray image.

For forming the second alignment member, the first alignment member may be heated, and then the ultraviolet light may be irradiated onto the heated first alignment member. The first alignment member may be heated at a predetermined temperature lower than a transition temperature of the liquid crystal.

According to an aspect of the present invention, there is provided a method of forming an alignment member for a liquid crystal display (LCD) device. In the method of forming the alignment member for the LCD device, an alignment material having a photoreactor is spread on a substrate to form an alignment material layer. Ultraviolet light is irradiated onto the alignment material layer to arrange the alignment material of the alignment material layer. Liquid crystal is disposed on the alignment material layer having the arranged alignment material. An electric field is applied to the liquid crystal to align the liquid crystal. Then, the ultraviolet light is irradiated onto the alignment material layer to cause a photopolymerization reaction of the alignment material layer, while applying the electric field to the liquid crystal.

According to the embodiments of the present invention, defects of a display panel may be reduced, and the display panel may be prevented from displaying afterimages.

BRIEF DESCRIPTION OF THE DRAWINGS

The above and other features of the embodiments of the present invention will become more apparent by reference to the following detailed description when considered in conjunction with the accompanying drawings wherein.

DESCRIPTION OF THE EMBODIMENTS

Figure 1:
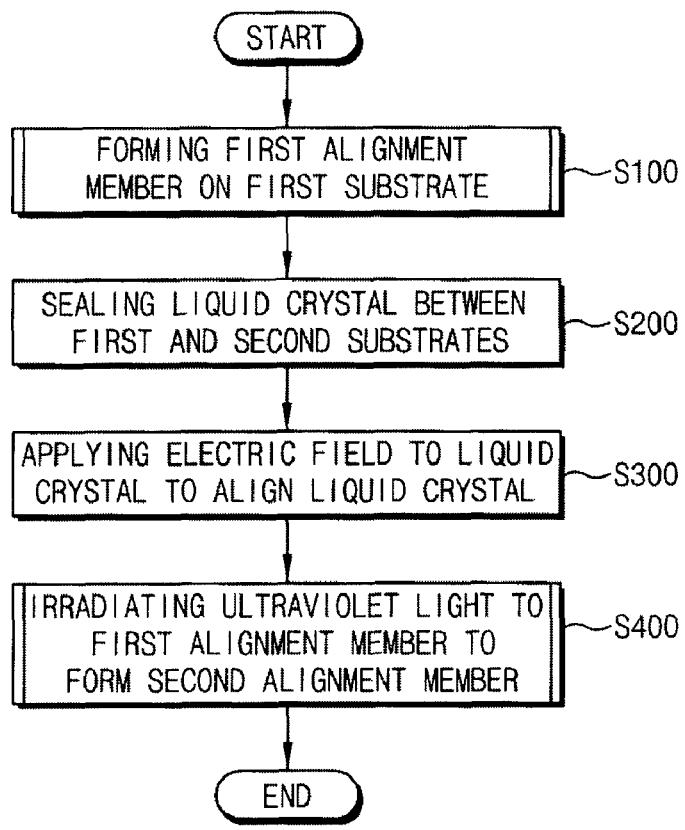
FIGS. 1 to 3 are flowcharts illustrating a method of manufacturing a display panel in accordance with an embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Figure 2:
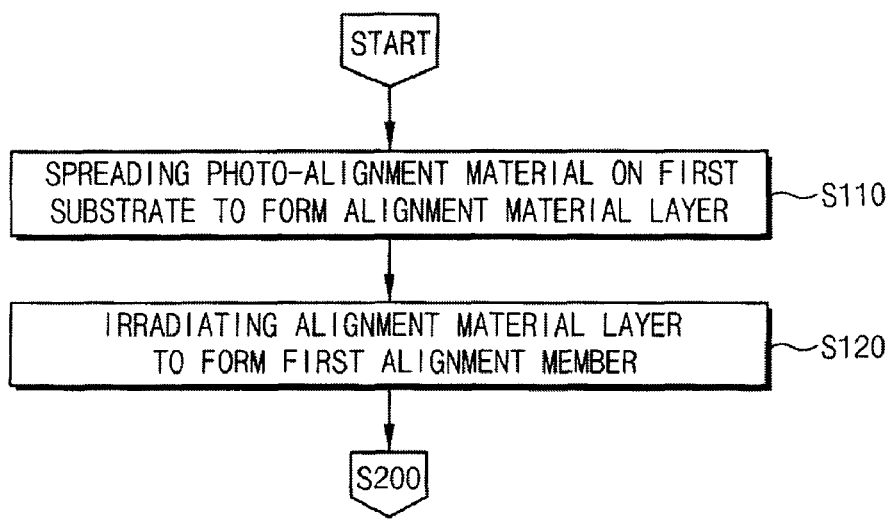
Figure 3:
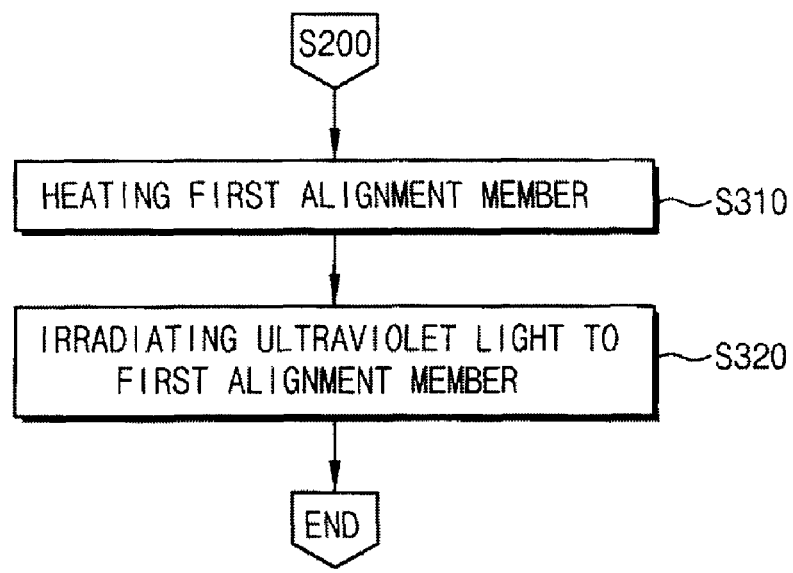

FIGS. 1 to 3 are flowcharts illustrating a method of manufacturing a display panel in accordance with an embodiment of the present invention.

Referring to FIGS. 1 to 3, a first alignment member is formed on a first substrate (step S100).

For example, an alignment material is spread on the first substrate to form an alignment material layer (step S110). The alignment material may include a polymer material, such as polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane, polymethyl methacrylate, etc. Then, ultraviolet light is irradiated onto the alignment material layer to form a first alignment member (step S120). The ultraviolet light may be aligned in an alignment direction. When the aligned ultraviolet light is irradiated onto the alignment material layer including the alignment material which is randomly aligned, photoreactors of the alignment material substantially perpendicular or substantially parallel to the alignment direction cause a photopolymerization reaction, so that the alignment material of the first alignment member may have structural anisotropy due to the photopolymerization reaction caused by the photoreactors. The first alignment member aligns liquid crystal molecules using the structural anisotropy of the alignment material.

A second substrate is disposed opposite to the first substrate on which the first alignment member is formed. In example embodiments of the present invention, the second substrate may have an alignment member. For example, when the first and second substrates form a vertical alignment (VA) mode display panel vertically arranging the liquid crystal molecules with respect to the first and second substrates, an alignment member may be formed on both the first substrate and the second substrate. Alternatively, an alignment member is not formed on the second substrate. For example, when the first and second substrates form an in-plane switching (IPS) mode display panel arranging the liquid crystal molecules in parallel with respect to the first and second substrates, the alignment member may be formed on the first substrate and is not formed on the second substrate.

Liquid crystal including the liquid crystal molecules is sealed between the first and second substrates (step S200).

For example, a sealing member may be formed along edge portions of the first and second substrates opposite to each other and the liquid crystal may be injected into a space formed by the first substrate, the second substrate and the sealing member by a dropping method or a vacuum injection method.

After the liquid crystal is sealed between the first and second substrate, an electric field is applied to the sealed liquid crystal, so that the liquid crystal is aligned (step S300). In the VA mode display panel, the liquid crystal is vertically arranged with respect to the first substrate when the electric field is not applied to the liquid crystal, and the liquid crystal is inclined with respect to the first substrate when the electric field is applied to the liquid crystal. In the IPS mode display panel, the liquid crystal is arranged in parallel to the first substrate when the electric field is not applied to the liquid crystal, and the liquid crystal is inclined with respect to the first substrate when the electric field is applied to the liquid crystal.

While the electric field is applied to the liquid crystal, ultraviolet light is irradiated to the first alignment member to form a second alignment member (step S400). The ultraviolet light may be aligned in a predetermined alignment direction. In example embodiments of the present invention, while the electric field is applied to the liquid crystal, the first alignment member is heated and then the ultraviolet light is irradiated to the heated first alignment member to form the second alignment member. When the first alignment member is heated, the photopolymerization reaction caused by the photoreactors of the first alignment member may be accelerated to reduce a time during which the ultraviolet light is irradiated to the first alignment member so as to form the second alignment member.

Alternatively, the second alignment member may be formed by irradiating the ultraviolet light to the first alignment member while the electric field is applied to the liquid crystal without heating the first alignment member. The first alignment member may include a first alignment layer including a polymer material and a first photoreactor protruding from the first alignment layer. The second alignment member may include a second alignment layer including the polymer material and a second photoreactor protruding from the second alignment layer. The first and second photoreactors may have an effect on the alignment of the liquid crystal.

The electric field applied to the liquid crystal may not directly apply any force to the photoreactors of the alignment members, and change arrangements of the liquid crystal. When the arrangements of the liquid crystal are changed by the electric field, the photoreactors receive direct force from the liquid crystal because the photoreactors align the liquid crystal. Therefore, an angle between each of the photoreactors and the first substrate may be changed when the electric field is applied to the liquid crystal. For example, in the VA mode display panel, the angle between each of the photoreactors and the first substrate increases when the electric field is applied to the liquid crystal. When the ultraviolet light is irradiated onto the first alignment layer under the electric field applied to the liquid crystal, the photoreactors of the first alignment member participate in the photopolymerization reaction. Therefore, an angle between each of the second photoreactors and the first substrate may be different from an angle between each of the first photoreactors and the first substrate.

FIGS. 4 to 9 are cross-sectional views illustrating the method of manufacturing the display panel. In FIGS. 4 to 9, although the VA mode display panel is shown, the embodiments of the present invention are not limited to the VA mode display panel. For example, the embodiments of the present invention may be applied to the IPS mode display panel.

Figure 4:
FIGS. 4 to 9 are cross-sectional views illustrating a method of manufacturing the display panel.

Referring to FIG. 4, a first electrode 130 is formed on a first base substrate 110. The first electrode 130 may include a transparent conductive material. For example, the first electrode 130 may include indium tin oxide (ITO) or indium zinc oxide (IZO). A first alignment member 150 is formed on the first electrode 130. The first alignment member 150 may include a first alignment layer 151 and a first photoreactor(s) 153. The first alignment layer 151 is formed on the first electrode 130. The first alignment layer may include a polymer material such as polyimide, polyamic acid, polyvinyl cinnamate, polyazobenzene, polyethyleneimine, polyvinyl alcohol, polyamide, polyethylene, polystyrene, polyphenylene phthalamide, polyester, polyurethane, polymethyl methacrylate, etc. The first photoreactor 153 protrudes from an upper surface of the first alignment layer 151 and aligns the liquid crystal.

Figure 5:
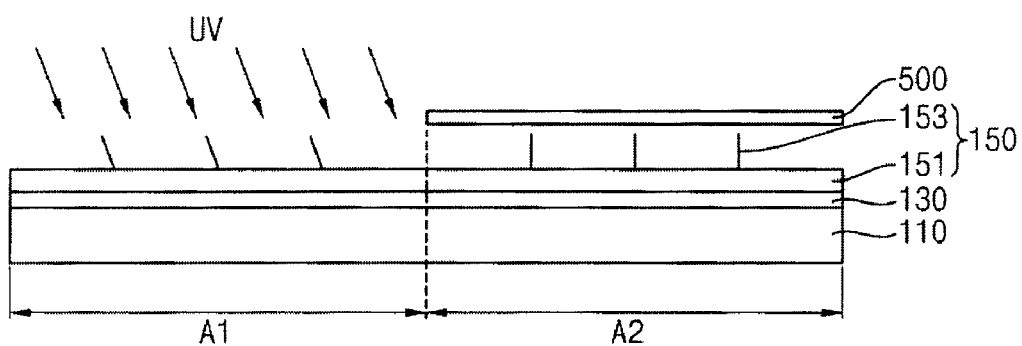
Figure 6:
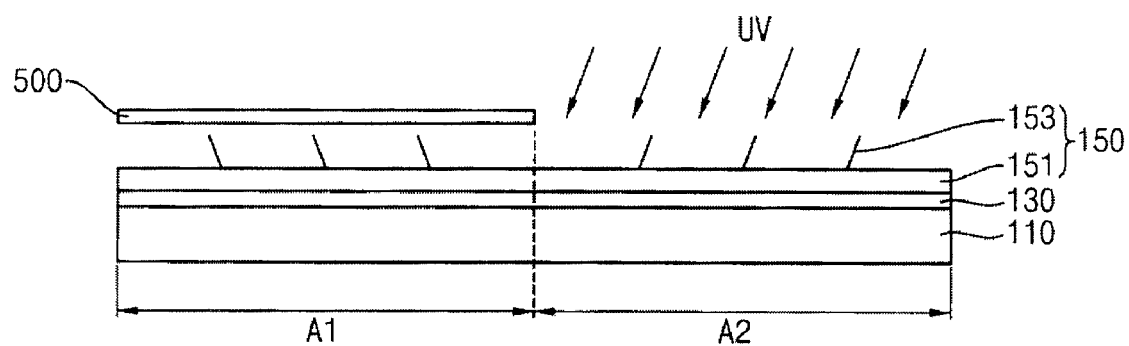

Referring to FIGS. 5 and 6, ultraviolet light is irradiated to the first alignment member 150 using a photomask 500. The ultraviolet light may be aligned in a predetermined alignment direction. When the aligned ultraviolet light is irradiated onto the first alignment member 150, a direction in which the aligned ultraviolet light is irradiated may change the photoreactors participating in the photopolymerization reaction. Therefore, the direction in which the aligned ultraviolet light is irradiated has an effect on the directionality of the first alignment member 150.

A method of forming a first region A1 and a second region A2 of the first alignment member 150, which have different directionalities from each other, will be described as an example. The ultraviolet light is irradiated onto the first alignment member 150 in a first direction after the second region A2 of the first alignment member 150 is covered by a photomask 500. The ultraviolet light is irradiated onto the first region A1 of the first alignment member 150 which is not covered by the photomask 500 and causes the photopolymerization reaction of the photoreactors in the first region A1 of the first alignment member 150. Therefore, the photoreactors in the first region A1 of the first alignment member 150 are inclined along the first direction when the ultraviolet light is irradiated onto the first region A1 of the first alignment member 150. Then, the ultraviolet light is irradiated onto the first alignment member 150 in a second direction different from the first direction after the first region A1 of the first alignment member 150 is covered by the photomask 500. The ultraviolet light is irradiated onto the second region A2 of the first alignment member 150 which is not covered by the photomask 500 and causes the photopolymerization reaction of the photoreactors in the second region A2 of the first alignment member 150. Therefore, the photoreactors in the second region A2 of the first alignment member 150 are inclined along the second direction when the ultraviolet light is irradiated onto the second region A2 of the first alignment member 150. In the above, although the first alignment member 150 includes two regions, the first alignment member 150 may include more than two regions divided by a method substantially the same as or similar to the above-mentioned method. When the first alignment member 150 includes a plurality of regions which have different directionalities from each other, a direction in which the liquid crystal is aligned is changed according to the regions of the first alignment member 150. Therefore, the viewing angle of the display panel may be increased.

Figure 7:
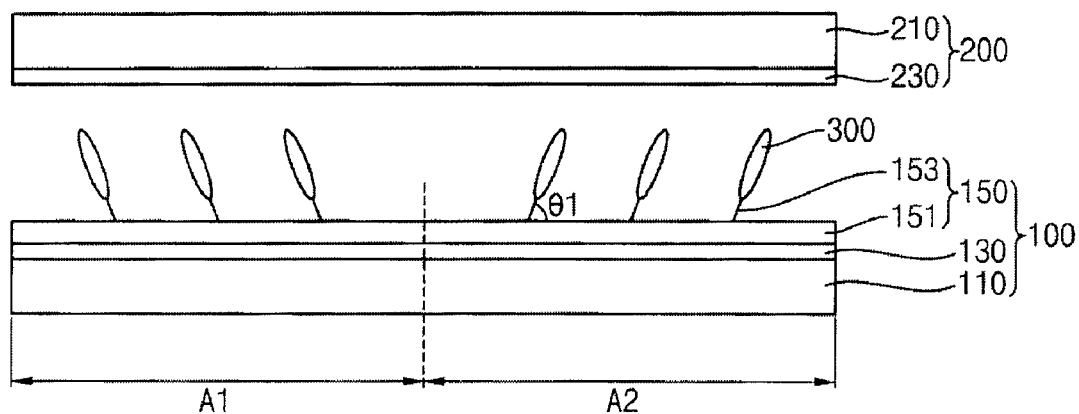

Referring to FIG. 7, a second substrate 200 is disposed to be opposite to the first substrate 100 having the first alignment member 150, and then liquid crystal 300 is sealed between the first and second substrates 100 and 200. When the first alignment member 150 includes the first region A1 and the second region A2, a portion of the liquid crystal 300 disposed on the first region A1 of the first alignment member 150 has an alignment direction different from that of another portion of the liquid crystal 300 disposed on the second region A2 of the first alignment member 150. For example, the portion of the liquid crystal 300 disposed on the first region A1 of the first alignment member 150 is aligned in the first direction because the first photoreactors 153 in the first region A1 of the first alignment member 150 are inclined along the first direction, and the portion of the liquid crystal 300 disposed on the second region A2 of the first alignment member 150 is aligned in the second direction because the first photoreactors 153 in the second region A2 of the first alignment member 150 are inclined along the second direction. The first photoreactors 153 may be inclined at a first angle θ1 with respect to the base substrate 110. The second substrate 200 includes a second base substrate 210 and a second electrode 230 formed on the second substrate 210. The second electrode 230 is opposite to the first electrode 130. The second electrode 230 may include a transparent conductive material.

Figure 8:
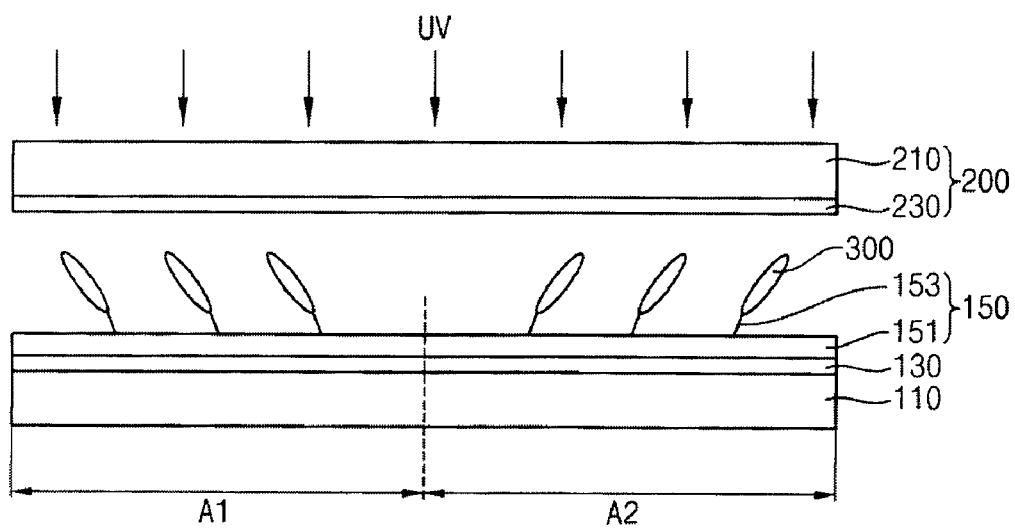
Figure 9:
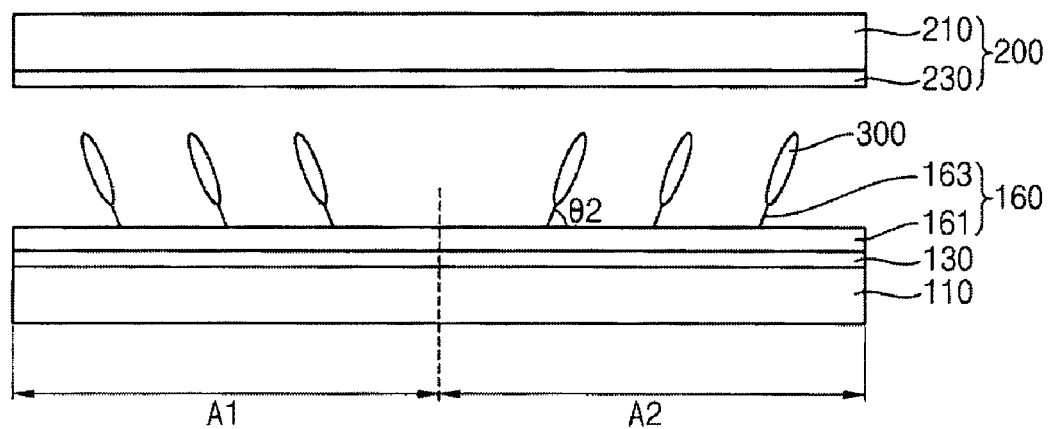

Referring to FIGS. 8 and 9, an electric field is applied to the liquid crystal 300 to align the liquid crystal 300. For example, in the VA mode display panel, when the electric field is applied to the liquid crystal 300, the electric field applies a force to arrange the liquid crystal 300 in parallel to the first base substrate 110. Thus, the liquid crystal 300 vertically arranged with respect to the first base substrate 110 is inclined at a predetermined angle with respect to the first base substrate 110 by the force. Additionally, in the VA mode display panel, the electric field is generated by a first voltage applied to the first electrode 130 and a second voltage applied to the second electrode 230. While the electric field is applied to the liquid crystal 300, the ultraviolet light is irradiated onto the first alignment member 150 to form a second alignment member 160. The second alignment member 160 may include a second alignment layer 161 and a second photoreactor 163. An amount of the photopolymerization reaction of the second alignment member 160 may be larger than that of the first alignment member 150, because the alignment material of the second alignment member 160 receives an amount of the ultraviolet light larger than that of the alignment material of the first alignment member 150. Thus, an anchoring energy of the second alignment member 160 may be larger than that of the first alignment member 150. As a result, the display panel manufactured by the methods in accordance with example embodiments of the present invention may reduce afterimages.

In example embodiments of the present invention, the ultraviolet light may be irradiated onto the first alignment member 150 to form the second alignment member 160, while the first alignment member 150 is heated. When the first alignment member 150 is heated, the photopolymerization reaction of the first alignment member 150 may be accelerated. The first alignment member 150 may be heated at less than a transition temperature of the liquid crystal.

After the second alignment member 160 is formed, lower and upper polarizing plates (not illustrated) may be disposed on the lower and upper surfaces of the first substrate 100, respectively.

Figure 10:
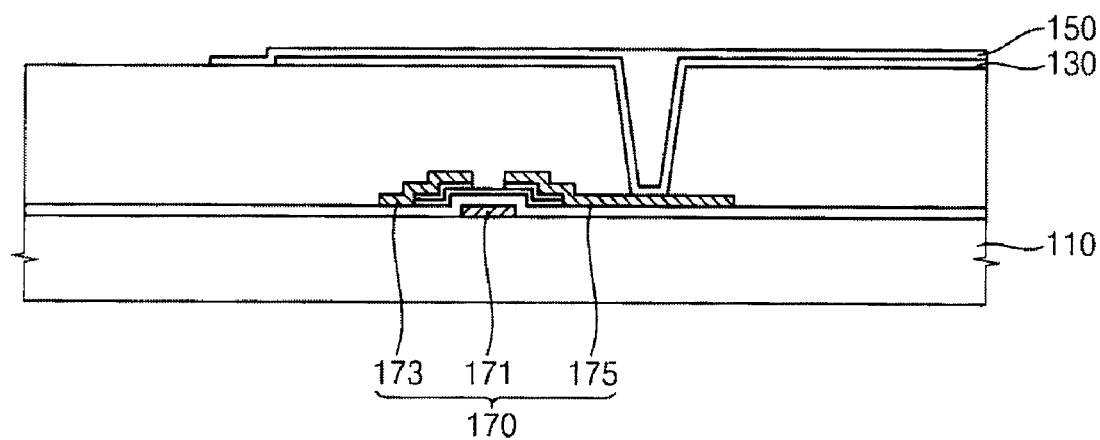
FIG. 10 is a cross-sectional view illustrating a first substrate manufactured by methods in accordance with embodiments of the present invention.
Figure 11:
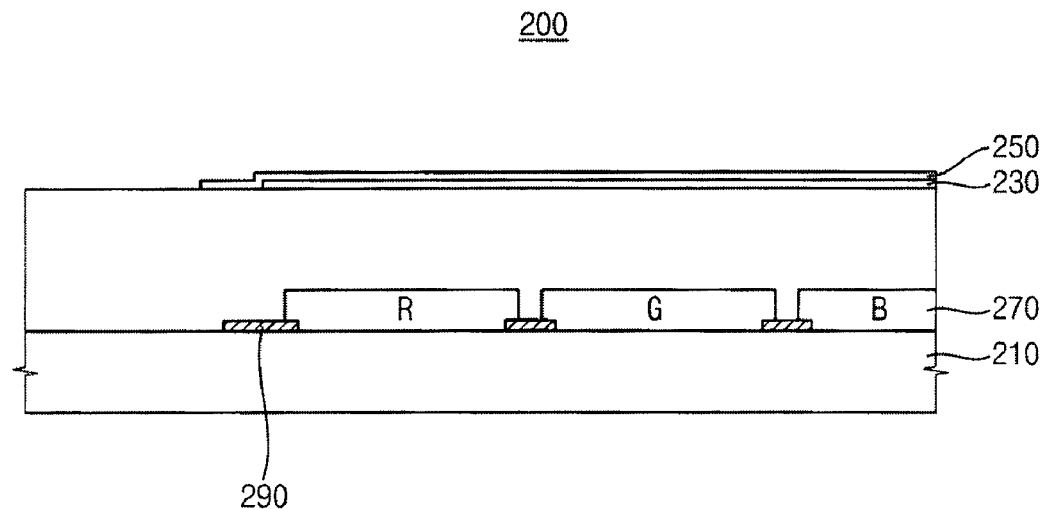
FIG. 11 is a cross-sectional view illustrating a second substrate manufactured by methods in accordance with embodiments of the present invention.

FIG. 10 is a cross-sectional view illustrating a first substrate and FIG. 11 is a cross-sectional view illustrating a second substrate manufactured by the methods in accordance with the embodiments of the present invention.

Referring to FIGS. 10 and 11, a first substrate 100 may include a first base substrate 110, a switching element 170 formed on the first base substrate 110, a signal line (not illustrated) connected to an input terminal of the switching element 170, a first electrode 130 connected to an output terminal of the switching element 170, and a first alignment member 150 formed on the first electrode 130. A second substrate 200 may include a second base substrate 210, a color filter 270 formed on the second base substrate 210, a second electrode 230 formed on the color filter 270, and a third alignment member 250 formed on the second electrode 230.

Figure 12:
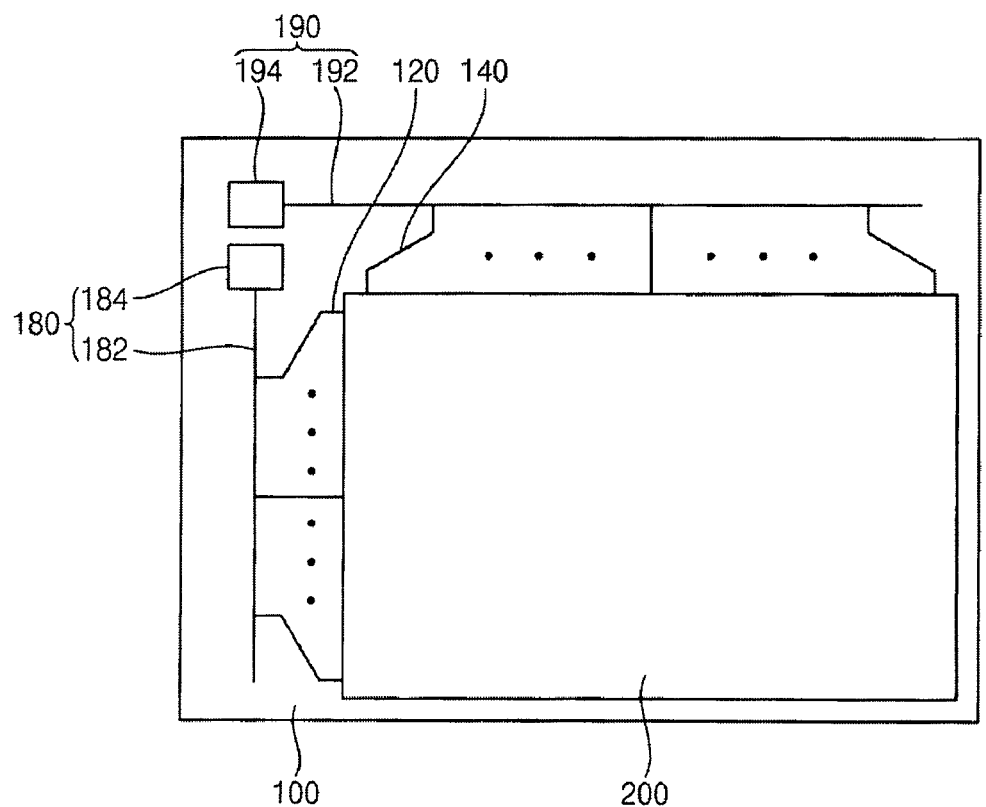
FIG. 12 is a plan view illustrating a display panel manufactured by methods in accordance with embodiments of the present invention.

FIG. 12 is a plan view illustrating a display panel manufactured by methods in accordance with embodiments of the present invention.

Referring to FIG. 12, a display panel includes a first substrate 100, a second substrate 200 and liquid crystal (not illustrated) sealed between the first and second substrates 100 and 200. The first substrate 100 includes a switching element (not illustrated), a first electrode (not illustrated) connected to an output terminal of the switching element, signal lines 120 and 140 respectively connected to a control terminal and an input terminal of the switching element, and inspection elements 180 and 190 for inspecting whether or not the signal lines 120 and 140 have defects. For example, the signal lines may include a gate line 120 extended in a first direction and a data line 140 extended in a second direction different from the first direction. The gate line 120 may be connected to a gate terminal of the switching element which is the control terminal of the switching element and the data line 140 is connected to a source terminal of the switching element which is the input terminal of the switching element. The inspection elements may include a first inspection element 180 and a second inspection element 190. The first inspection element 180 may include a first inspection line 182 and a first inspection pad 184. The first inspection line 182 is connected to the gate line 120. The first inspection pad 184 is connected to the first inspection line 182. The first inspection pad 184 receives a first inspection signal from an external device and provides the first inspection line 182 with the first inspection signal. The second inspection element 190 may include a second inspection line 192 and a second inspection pad 194. The second inspection line 192 is connected to the data line 140. The second inspection pad 194 is connected to the second inspection line 192. The second inspection pad 194 receives a second inspection signal from the external device and provides the second inspection line 192 with the second inspection signal.

In example embodiments of the present invention, the first voltage applied to the first electrode of the first substrate to form the electric field applied to the liquid crystal may be provided through the inspection elements 180 and 190. For example, a gate-on voltage is applied to the first inspection pad 184 and a second voltage corresponding to the first voltage is applied to the second inspection pad 194. The gate-on voltage is transferred into the gate terminal of the switching element to turn on the switching element through the first inspection line 182 and the gate line 120. When the switching element is turned on, the second voltage corresponding to the first voltage is transferred into the first electrode through the second inspection line 192, the data line 140 and the switching element, so that the first voltage is applied to the first electrode. The first voltage may be larger than a gray voltage which is required for displaying a gray image. For example, the first voltage applied to the first electrode may be a white voltage which is required for displaying a white image. When the first voltage is smaller than the gray voltage, the display panel may display afterimages because a first angle between the first photoreactor of the first alignment member and the first substrate is substantially the same as a second angle between the second photoreactor of the second alignment member and the first substrate.

Figure 13:
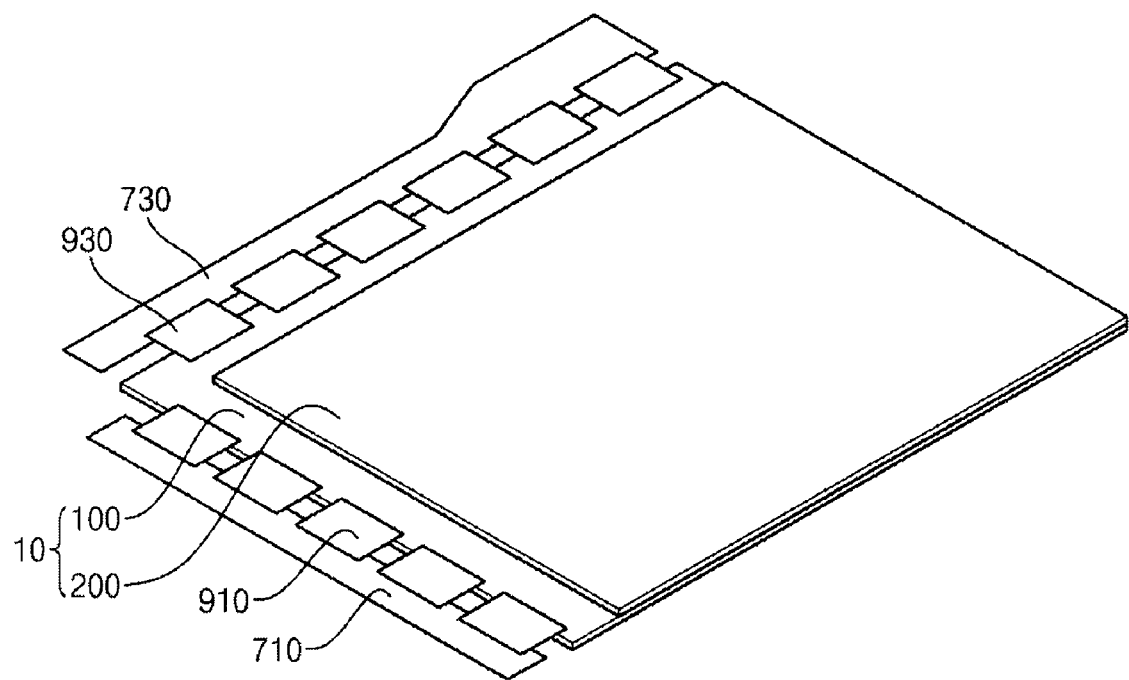
FIG. 13 is a perspective view illustrating the display panel manufactured by methods in accordance with embodiments of the present invention.

FIG. 13 is a perspective view illustrating the display panel manufactured by methods in accordance with embodiments of the present invention.

Referring to FIG. 13, printed circuit boards (PCBS) 710 and 730 may be connected to the display panel 10 in which the liquid crystal is sealed. The display panel 10 includes a first substrate 100, a second substrate 200 and liquid crystal (not illustrated) sealed between the first and second substrates 100 and 200. The PCBs include a gate PCB 710 and a data PCB 730. The first substrate 100 includes a switching element (not illustrated), a first electrode (not illustrated) connected to an output terminal of the switching element and signal lines (not illustrated) connected to a control terminal and an input terminal of the switching element. For example, the signal lines may include a gate line connected to a gate terminal of the switching element which is the control terminal of the switching element and a data line connected to a source terminal of the switching element which is the input terminal of the switching element. The gate PCB 710 is connected to the gate line by a first tape carrier package (TCP) 910. The data PCB 730 is connected to the data line by a second TCP 930.

In example embodiments of the present invention, the first voltage applied to the first electrode of the first substrate 100 for applying the electric field to the liquid crystal may be provided through the gate PCB 710 and the data PCB 730. For example, the gate-on voltage is applied to the gate PCB 710 and the second voltage corresponding to the first voltage is applied to the data PCB 730. The gate-on voltage is transferred into the gate terminal of the switching element to turn on the switching element through the first TCP 910 and the gate line. When the switching element is turned on, the second voltage corresponding to the first voltage is transferred into the first electrode through the second TCP 930, the data line and the switching element, so that the first voltage is applied to the first electrode. The first voltage may be larger than a gray voltage which is required for displaying a gray image. For example, the first voltage applied to the first electrode may be a white voltage which is required for displaying a white image.

Figure 14:
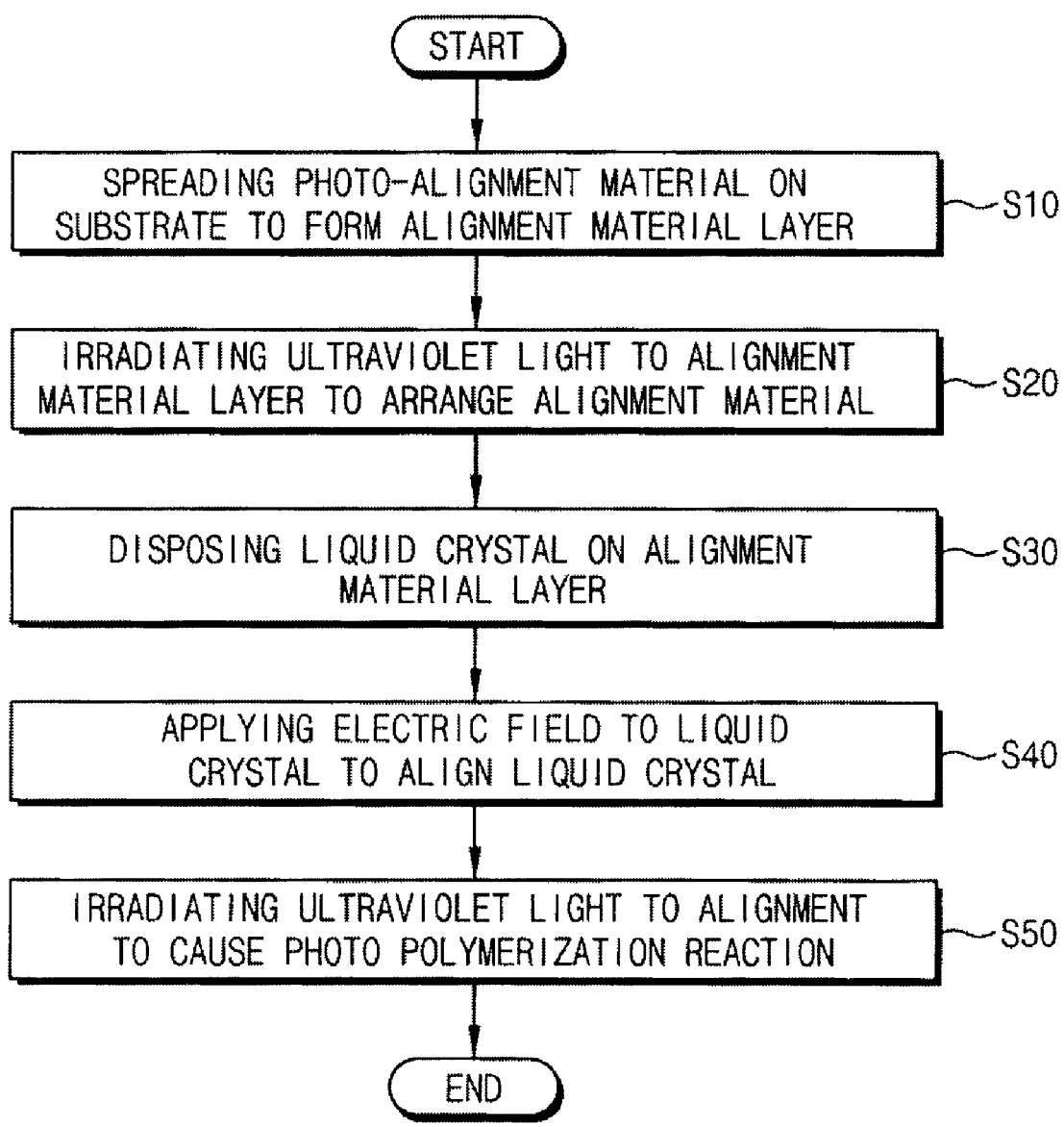
FIG. 14 is a flowchart illustrating a method of forming an alignment member for an LCD apparatus, according to an embodiment of the present invention.

FIG. 14 is a flowchart illustrating a method of forming an alignment member for an LCD apparatus.

Referring to FIG. 14, an alignment material is spread on a substrate to form an alignment material layer on the substrate (step S10). The alignment material may include a polymer material having photoreactive properties. Ultraviolet light is irradiated onto the alignment material layer to arrange the alignment material of the alignment material layer (step S20). The ultraviolet light may be aligned in a predetermined direction, so that the arranged alignment material has structural anisotropy. Then, liquid crystal is disposed on the alignment material layer (step S30). The liquid crystal disposed on the alignment material layer may be pretilted in an alignment direction of the alignment material layer. When an electric field is applied to the liquid crystal, the liquid crystal may be uniformly arranged because the liquid crystal is pretilted in the alignment direction of the alignment material layer (step S40). Then, while the electric field is applied to the liquid crystal, the ultraviolet light is irradiated onto the alignment material layer to cause the photopolymerization reaction of the alignment material layer (step S50). Therefore, the display quality of an LCD device may be improved.

In example embodiments of the present invention, while an alignment material layer is heated, ultraviolet light may be irradiated to the alignment material layer, so that a photopolymerization reaction of the alignment material layer may be accelerated. A first alignment material layer may be heated at less than a transition temperature of liquid crystal.

Accordingly, the above-described method may be used to manufacture a display panel displaying images which do not include afterimages and to reduce defects of the display panel.

The foregoing is illustrative of embodiments of the present invention and is not to be construed as limiting thereof. Although a few example embodiments of the present invention have been described, those skilled in the art will readily appreciate that many modifications are possible to the example embodiments without materially departing from the novel teachings and advantages of this invention. Accordingly, all such modifications are intended to be included within the scope of the present invention as defined in the claims. Therefore, it is to be understood that the foregoing is illustrative of the embodiments of the present invention and is not to be construed as limited to the specific embodiments disclosed, and that modifications to the disclosed embodiments, as well as other embodiments, are intended to be included within the scope of the appended claims.

What is claimed is:

1. A method of manufacturing a display panel, comprising:
   forming a first alignment member on a first substrate;
   sealing liquid crystal between the first substrate and a second substrate opposite to the first substrate;
   applying an electric field to the liquid crystal to align the liquid crystal; and
   irradiating ultraviolet light onto the first alignment member to form a second alignment member while applying the electric field to the liquid crystal.

2. The method of claim 1, wherein forming the first alignment member comprises:
   spreading an alignment material on the first substrate to form an alignment material layer; and
   irradiating ultraviolet light onto the alignment material layer to form the first alignment member.

3. The method of claim 2, wherein irradiating the ultraviolet light onto the alignment material layer comprises:
   irradiating the ultraviolet light onto a first region of the alignment material layer in a first direction; and
   irradiating the ultraviolet light onto a second region of the alignment material layer adjacent to the first region in a second direction different from the first direction.

4. The method of claim 1, wherein irradiating the ultraviolet light onto the first alignment member comprises:
   irradiating the ultraviolet light onto a first alignment layer of the first alignment member and a first photoreactor of the first alignment member protruding from a surface of the first alignment layer to form a second alignment layer of the second alignment member and a second photoreactor of the second alignment member protruding from a surface of the second alignment layer.

5. The method of claim 4, wherein irradiating the ultraviolet light onto the first alignment member further comprises:
   inclining the first photoreactor toward the first substrate to form the second photoreactor.

6. The method of claim 1, wherein applying an electric field to the liquid crystal comprises:
   applying a first voltage to a first electrode of the first substrate formed under the first alignment member; and
   applying a second voltage different from the first voltage to a second electrode of the second substrate.

7. The method of claim 6, wherein the first voltage has a level that is larger than a level of a voltage for displaying a gray image.

8. The method of claim 7, wherein the first voltage has a level that is substantially identical to a level of a voltage for displaying a white image.

9. The method of claim 6, further comprising:
   forming a switching element electrically connected to the first electrode and signal lines connected to the switching element on the first substrate.

10. The method of claim 9, further comprising:
    attaching a printed circuit board (PCB) electrically connected to the signal lines to the first substrate.

11. The method of claim 9, further comprising:
    forming an inspection element electrically connected to the signal lines to receive an inspection signal from an external device and transfer the inspection signal to the first electrode through the signal line.

12. The method of claim 1, wherein irradiating the ultraviolet light onto the first alignment member comprises:
    heating the first alignment member; and
    irradiating the ultraviolet light onto the heated first alignment member.

13. The method of claim 12, wherein the first alignment member is heated at a predetermined temperature lower than a transition temperature of the liquid crystal.

14. The method of claim 13, further comprising:
    disposing a first polarizing plate having a first polarizing axis on an exterior surface of the first substrate after irradiating the ultraviolet light onto the first alignment member; and
    disposing a second polarizing plate having a second polarizing axis substantially perpendicular to the first polarizing axis on an exterior surface of the second substrate.

15. A method of forming an alignment member for an LCD device, comprising:
    spreading an alignment material having a photoreactor on a substrate to form an alignment material layer;
    irradiating ultraviolet light onto the alignment material layer to arrange the alignment material of the alignment material layer;
    disposing liquid crystal on the alignment material layer having the arranged alignment material;
    applying an electric field to the liquid crystal to align the liquid crystal; and
    irradiating ultraviolet light onto the alignment material layer to cause a photopolymerization reaction of the alignment material layer, while applying the electric field to the liquid crystal.

16. The method of claim 15, wherein irradiating the ultraviolet light onto the alignment material layer to cause the photopolymerization reaction comprises:
    heating the alignment material layer; and
    irradiating the ultraviolet light onto the heated alignment material layer.

17. The method of claim 16, wherein the alignment material layer is heated at a predetermined temperature lower than a transition temperature of the liquid crystal.

* * * * *